United States Patent Office 3,119,822
Patented Jan. 28, 1964

---

3,119,822
QUATERNARY AMMONIUM DERIVATIVES OF 2-HALO-4-ALIPHATIC SUBSTITUTED AMINO-s-TRIAZINES
Kurt Engel, Basel, Switzerland, assignor to Robapharm A.G., Basel, Switzerland, a Swiss company
No Drawing. Filed Nov. 5, 1962, Ser. No. 235,538
Claims priority, application Switzerland Nov. 3, 1961
7 Claims. (Cl. 260—249.5)

The present invention relates to new quaternary ammonium compounds of the general formula:

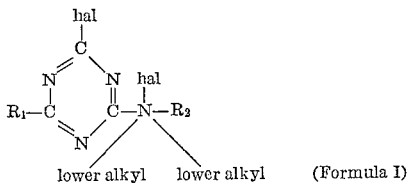

(Formula I)

wherein $R_1$ means halogen, alkoxy, thioalkyl, amino, aminoalkyl, cycloalkyl, aminoaryl or aminoaralkyl groups, $R_2$ means a high molecular aliphatic radical, lower alkyl means the methyl or ethyl radical and hal means a halogen atom, e.g., chlorine or bromine, as well as to methods for their preparation.

These new compounds possess improved disinfective effect and have good crystallization properties. Various members of the new class of compounds are, moreover, suitable as cytostatics and antipyretics.

Since most of the new compounds in a powderous form dissolve rapidly in water, the good crystallizability is of great advantage in the practical use of the new compounds as disinfectants.

According to one embodiment of the present invention the new heterocyclic-aliphatic ammonium compounds may be prepared by reacting a tertiary aliphatic amine of the general formula:

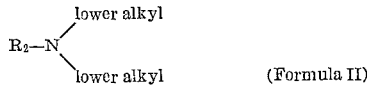

(Formula II)

with a cyanuric compound of the general formula:

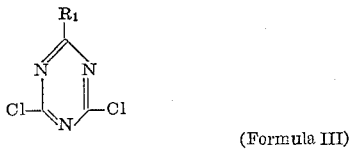

(Formula III)

wherein $R_1$ and $R_2$ have the above meanings. The reaction may be performed in a manner known per se.

According to a further embodiment of the invention the new compounds may also be prepared by reacting a tertiary amine of the general formula:

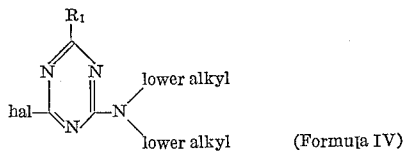

(Formula IV)

with a compound of the general formula:

$R_2.hal$

This method of preparation may also be performed in a manner known per se, $R_1$, $R_2$ and hal having the above meanings.

A still further method of preparing the new compounds of the above said Formula I consists in treating a tertiary amine of the general formula:

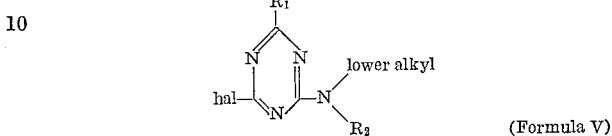

(Formula V)

with a lower alkyl chloride or bromide, e.g., methyl chloride or methyl bromide, $R_1$, $R_2$ and hal having the above meanings.

The reactions defined hereinabove may be performed in the presence or absence of suitable solvents, e.g., acetone, benzene, toluene, ethyl acetate and butyl acetate, and may be accelerated or initiated by heating, operating, if desired, in an autoclave. The reactions may also be facilitated by the addition of small amounts of potassium iodide.

The tertiary amines and halogen compounds employed as starting substances are known in part. Where this is not the case, they can be prepared by methods known per se for preparing similar compounds.

As starting materials corresponding to the above said Formula III, the following compounds come in question by way of example:

s-trichlorotriazine,
2:4-dichloro-6-methyloxy-1:3:5-triazine,
2:4-dichloro-6-amino-1:3:5-triazine,
2:4-dichloro-6-diethylamino-1:3:5-triazine,
2:4-dichloro-6-piperidino-1:3:5-triazine,
2:4-dichloro-6-phenoxy-1:3:5-triazine,
2:4-dichloro-6-p-chlorophenoxy-1:3:5-triazine,
2:4-dichloro-5-p-methylphenoxy-1:3:5-triazine,
2:4-dichloro-6-(2':4'-dimethyl-phenoxy)-1:3:5-triazine,
2:4-dichloro-6-benzylamino-1:3:5-triazine,
2:4-dichloro-6-ethyl sulphide-1:3:5-triazine, and the like.

The higher molecular alkyl radical having 6 to 17 carbon atoms, and preferably 10 to 14 carbon atoms, does not need to be uniform with respect to the chain length. Technical mixtures of compounds having varying chain lengths may also be employed, such as are obtained by starting from fatty acid mixtures for the preparation of the starting products. Such mixtures may also contain a small proportion of lower compounds, e.g., with 6 to 8 carbon atoms.

The new compounds may be used in the form of aqueous solutions thereof for the disinfection of the surface skin of human beings and animals, as well as for the disinfection of rooms, floors, or of all types of articles of use, such as cutlery, tableware, medical instruments, sickroom linens, etc., and also of sputum, excrements, etc.

The new water-soluble compounds may be in tablet form, either alone or in combination with suitable binding or disintegrating agents. The new compounds may, moreover, be adapted to the most varying uses, e.g., by the addition of other substances having a more or less disinfecting action, such as, for example, phenol, or of anti-rusting agents, such as, for instance, sodium nitrite or sodium octyl hydroxyacetate.

The inventive compounds of the above said Formula I may also be combined with powdery substances or with organic solvents, and they may furthermore be incorporated into ointments in any conventional way.

The disinfective action of the compounds of the invention is good with respect to both gram negative and gram positive pathogens.

The following examples serve to illustrate the invention without, however, this latter being restricted thereto. When nothing is stated to the contrary, parts mentioned therein mean parts by weight. Parts by weight and parts by volume are in the relationship of grams to milliliters. The temperatures are cited in degrees centigrade.

EXAMPLE 1

1/10 mole of cyanuric chloride is dissolved in 100 ml. of acetone. This solution is then filtered and the filtrate is diluted dropwise, while stirring and at −5 to 0° C., with 1/10 mole of dimethyldodecylamine dissolved in 20 ml. of acetone. After the dropwise addition is completed, the solution is further stirred for one-half hour. The reaction mixture is then filtered off by suction, whereby the desired quaternary compound of the formula:

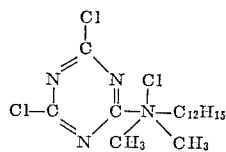

is obtained. Further amounts of the pure product can be obtained by concentrating the filtrate.

Instead of pure dimethyldodecylamine, one may also use a technical mixture of compounds of the formula:

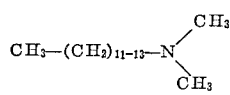

such as is commercially readily obtainable.

The further compounds of the above general Formula I may be prepared in an analogous manner according to the data given in the above Example 1.

In the following table a number of examples are listed, in which each radical R present in the cyanuric compounds has a different meaning.

Table 1

| Example | Tert.-amine | Radical R of the cyanuric compound | End product |
|---|---|---|---|
| 2 | techn. dimethyldodecylamine | $-OCH_3$ | white crystals. |
| 3 | do | $-OC_2H_5$ | Do. |
| 4 | do | $-O-\langle\bigcirc\rangle$ | Do. |
| 5 | do | $-O-\langle\bigcirc\rangle-CH_3$ | white paste. |
| 6 | do | $-O-\langle\bigcirc\rangle$ with $CH_3$ | oily substance. |

Table 1—Continued

| Example | Tert.-amine | Radical R of the cyanuric compound | End product |
|---|---|---|---|
| 7 | techn. dimethyldodecylamine | $-O-\langle\bigcirc\rangle-CH_3$ with $CH_3$ | white crystals. |
| 8 | do | $-O-\langle\bigcirc\rangle-Cl$ | fatty substance difficultly soluble in $H_2O$. |
| 9 | do | $-O-\langle\bigcirc\rangle-\langle\bigcirc\rangle$ | white crystals. |
| 10 | do | $-NH_2$ | white, somewhat fatty crystals. |
| 11 | do | $-N(C_2H_5)_2$ | pasty white substance. |
| 12 | do | $-NH-CH(CH_3)_2$ | ointment-like substance. |
| 13 | do | $-NH \cdot CH_2 \cdot CH_2 \cdot OH$ | fatty substance. |
| 14 | do | $-N(CH_2-CH_2)_2 CH_2$ (piperidino) | Do. |
| 15 | do | $-N(CH_2-CH_2)_2 O$ (morpholino) | Do. |
| 16 | do | $-NH \cdot CH_2-\langle\bigcirc\rangle$ | white paste dissolves opal in $H_2O$. |
| 17 | do | $-S-C_2H_5$ | white crystals. |
| 18 | do | $-S-\langle\bigcirc\rangle$ | Do. |

Where not particularly noted, all compounds are water-soluble.

In those cases where the quaternary ammonium compounds of the above examples do not precipitate, the precipitation thereof may be effected by adding ether.

In order to prove the biological properties of the new compounds, various tests have been made. The same were tested and screened for biological activity, especially aimed at those displaying bactericidal and fungicidal activities.

Investigations also embraced toxicity tests in mice. Also antipyretic and analgesic properties have been tested in some cases.

I TEST METHODS (1) *Toxicity in mice, after intravenous injection.*—Groups of ten animals, weighing 18–36 g., received progressive doses injected into the venes of the tail. The DL–50 was determined by way of intrapolation according to Schleicher and Schüll (298½). Time of observation: 2 days.

(2) *Analysis of reactions in rabbits.*—Rabbits, weighing 3–4 kg. were injected aqueous solutions of 1–5% (depending on the solubility of the preparation) at a rate of 1 ml. per minute. The animals were kept under close observation and watched for any symptoms that might occur. The injections were discontinued in case of strong toxic effect.

(3) *Anaerobic fermentation of baker's yeast.*—The formation of $CO_2$ was determined by measuring the pressure changes of a suspension of 0.5% baker's yeast in a Warburg apparatus kept under a $CO_2$ atmosphere and at a temperature of 30° C.

Tests were run on various series of solutions of progressive dilution, prepared from a 0.01 molar solution of the active substance in 5% glucose, which also serves as a basis for preparing all the other dilutions (stock solutions).

Control tests were made with solutions containing the corresponding amount of glucose. Readings were taken every ten minutes during the first hour, and afterwards every 15 minutes.

(4) $O_2$-*consumption of* E. coli.—The $O_2$ consumption of a prolific strain of *E. coli* (015/K) was determined in a Warburg apparatus by measuring the pressure changes of the gas. Series of different dilutions have been tested, prepared from a 0.01 mole aqueous solution of the active compound and 1% glucose. After an initial period of 30 minutes the so-prepared solutions containing the active principle were given to the suspension of bacteria. Readings were taken at intervals of 30 minutes.

(5) *Testing the cytostatic effect on cultures of Mastocytom P–815 in vitro.*—Suspensions of cultures of Mastocytom were prepared in a nutritive medium according to Schindler and kept in so-called roll-tubes. After 24 hours' time of contact with the active substance, a cell count of the cultures was made.

(6) *Antipyretic effect in rats.*—Groups of 5 rats, weighing 220–250 g. received 10 ml./kg. b.w. of a yeast emulsion I.M. Half an hour before this experiment is started the temperature of the animal was checked. 16 hours after the yeast injection, an aqueous solution of the substance to be tested is administered intraperitoneally. At this moment the temperature is checked, and repeated at 30 minutes' intervals for 8 hours.

II. RESULTS

A selected number of derivatives identified by their chemical groups are contained in Table 2, and also the data of activity have been compiled therein.

The bactericidal and fungicidal activity is indicated in terms of molefractions, which represent the lowest concentration of the active preparation still being effective; figures for cytostatic activity, however, must be read as millimolar concentrations.

Under "antipyretic activity" is stated the dosis administered, drop of temperature, and duration of this activity displayed, as well as the time when the activity actually sets in.

The meaning of the short designations E–401, E–437 etc., is given in the following Table 2.

*E–401.*—This halogenated derivative of the triazine ring structure, which can be obtained by means of a simple procedure, shows values of antibacterial and fungicidal activity which are comparable to those of Bradosol.

The depressive effect exerted on the respiration of coli bacteria is surpassed only by E–433, which, on the other hand, needs a tenfold concentration to inhibit the anaerobic fermentation of yeast.

E–401 showed an intense antipyretic action in the yeast-fever test. But no analgesic activity could be demonstrated. As for the cytostatic activity, it is interesting to note, that E–401, compared with Colcemid, maintains the cytostatic activity in concentration at least 100 times lower than the effective concentration in the bacteriological test.

*E–431, E–437, E–432, E–433.*—There is no significant difference in biological activity between the above-mentioned preparations and E–401. The antibacterial activity against *E. coli* proved to be slightly higher in the case of E–433, while E–437 fell a little short compared to E–401, E–431 and E–432.

In the anaerobic formentation test of yeast, they were all found to be a little less active ($<10^{-3}$ mol) than E–401 and Bradosol ($<10^{-4}$ mol).

III. SUMMARY

As evidenced by biological assay, the various preparations tested represent a useful group of disinfectants. E–401 stands out, for it can be prepared with great ease, and its antibacterial and fungicidal activity are well within the range of activity of the best commercial products.

*Table 2*

| Group | Product tested | Compound of Formula I, $R_1$ having the meaning set out below [1] | Toxity DL–50, mg./kg. I.V. (mice) | Symptoms observed |
|---|---|---|---|---|
| I | E–401 | —Cl | ~75 | depression, stupor, paralysis, clonus. |
| II | E–431 | —$NH_2$ | ~60 | ataxia, paralysis, clonus. |
| II | E–437 | —N(C$_2$H$_5$)(C$_2$H$_5$) | ~75 | ataxia, paralysis, asphyxia, clonus. |
| III | E–432 | —O—C$_6$H$_4$—CH$_3$ | ~75 | paralysis, asphyxia. |
| III | E–433 | —O—C$_6$H$_3$(CH$_3$)$_2$ | ~63 | ataxia, paralysis, tremor, asphyxia. |
| Bradosol | | | ~30 | |
| Griseofulvin | | | | |
| Colcemid | | | | |

Table 2—Continued

| Group | Product tested | Compound of Formula I, R₁ having the meaning set out below [1] | Lowest Mohr concentration being effective | | |
|---|---|---|---|---|---|
| | | | Respiration | Anaerobic fermentation, Yeast | Mastocytom (millimols) |
| I | E-401 | —Cl | $>10^{-5}$ $<5\times10^{-5}$ | $>10^{-4}$ $<10^{-3}$ | $>10^{-3}$ $<10^{-2}$ |
| II | E-431 | —NH₂ | $>10^{-5}$ $<5\times10^{-5}$ | $>10^{-4}$ $<10^{-3}$ | |
| | E-437 | —N(C₂H₅)(C₂H₅) | $>5\times10^{-5}$ $<10^{-4}$ | $>10^{-4}$ $<10^{-3}$ | |
| III | E-432 | —O—C₆H₄—CH₃ | $>10^{-5}$ $<5\times10^{-5}$ | $>10^{-4}$ $<10^{-3}$ | |
| | E-433 | CH₃—C₆H₃(—O—)—CH₃ | $>10^{-5}$ $<5\times10^{-5}$ | $>10^{-5}$ $<10^{-4}$ | |
| Bradosol | | | $>10^{-5}$ $<10^{-4}$ | $>10^{-5}$ $<10^{-4}$ | |
| Griseofulvin | | | | $>10^{-3}$ | |
| Colcemid | | | | | $<10^{-4}$ |

| Group | Product tested | Compound of Formula I, R₁ having the meaning set out below | Anti-pyretic effect (rats) | | | |
|---|---|---|---|---|---|---|
| | | | Mg./kg., I.P. | ΔT, °C. | Duration | Max. Δ |
| I | E-401 | —Cl | 100 | −5.4 | >8 | 5 |
| II | E-431 | —NH₂ | 50 | −2.6 | >8 | 1 |
| | E-437 | —N(C₂H₅)(C₂H₅) | 50 | −2.0 | ~8 | 1 |
| III | E-432 | —O—C₆H₄—CH₃ | 50 | −3.1 | ~6 | 11 |
| | E-433 | CH₃—C₆H₃(—O—)—CH₃ | 50 | −3.2 | ~6 | 1½ |

[1] R₂ means in the tested compounds the dodecyl radical, hal means the chlorine atom and each lower alkyl means the methyl radical.

What I claim is:

1. A quaternary compound of the formula—

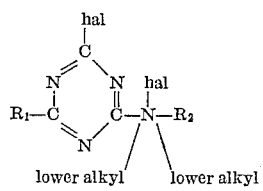

wherein R₁ is a member selected from the group consisting of chloro, (lower)alkoxy, ethylthio, phenylthio, amino, diethylamino, isopropylamino, piperidino, benzylamino, phenoxy, chlorophenoxy, methylphenoxy, dimethylphenoxy, diphenyloxy, hydroxyethylamine, and morpholino, R₂ is alkyl of 6 to 17 carbons and hal is a member selected from the group consisting of chlorine and bromine.

2. A quaternary compound of the formula—

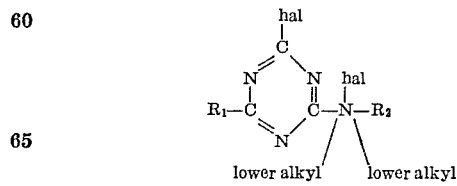

wherein R₁ is a member selected from the group consisting of chloro, (lower)alkoxy, ethylthio, phenylthio, amino, diethylamino, isopropylamino, piperidino, benzylamino, phenoxy, chlorophenoxy, methylphenoxy, dimethylphenoxy, diphenyloxy, hydroxyethylamine, and morpholino, R₂ is alkyl of 10 to 14 carbons and hal is a member selected from the group consisting of chlorine and bromine.

3. Quaternary ammonium compound of the formula—

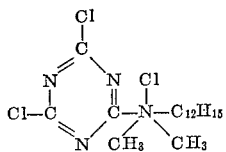

wherein the $C_{12}H_{15}$ moiety is dodecyl.

4. Quaternary ammonium compound of the formula—

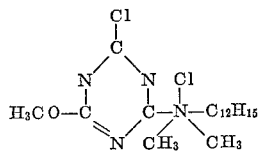

wherein the $C_{12}H_{15}$ moiety is dodecyl.

5. Quaternary ammonium compound of the formula—

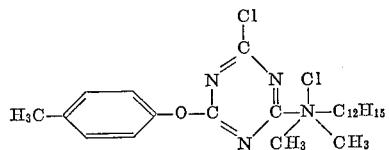

wherein the $C_{12}H_{15}$ moiety is dodecyl.

6. Quaternary ammonium compound of the formula—

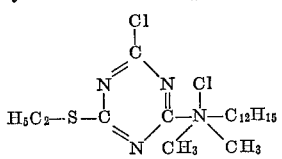

wherein the $C_{12}H_{15}$ moiety is dodecyl.

7. Quaternary ammonium compound of the formula—

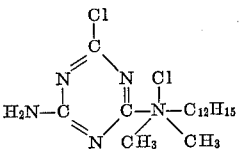

wherein the $C_{12}H_{15}$ moiety is dodecyl.

References Cited in the file of this patent

UNITED STATES PATENTS

| | | |
|---|---|---|
| 2,719,156 | De Benneville et al. | Sept. 27, 1955 |
| 2,848,453 | Schuller | Aug. 19, 1958 |

FOREIGN PATENTS

| | | |
|---|---|---|
| 174,377 | Austria | Mar. 25, 1953 |
| 888,699 | Germany | Sept. 3, 1953 |